United States Patent
Strickland (10) Patent No.: US 11,796,030 B2
(45) Date of Patent: Oct. 24, 2023

(54) MAIN PISTON BOOST VALVE IN A VEHICLE DAMPER

(71) Applicant: Fox Factory, Inc., Duluth, GA (US)

(72) Inventor: Rick Strickland, Watsonville, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/942,836

(22) Filed: Sep. 12, 2022

(65) Prior Publication Data

US 2023/0003275 A1    Jan. 5, 2023

Related U.S. Application Data

(63) Continuation of application No. 16/862,156, filed on Apr. 29, 2020, now Pat. No. 11,448,283.

(60) Provisional application No. 62/840,030, filed on Apr. 29, 2019.

(51) Int. Cl.
| | |
|---|---|
| *F16F 9/44* | (2006.01) |
| *F16F 9/516* | (2006.01) |
| *F16F 9/19* | (2006.01) |
| *F16F 9/46* | (2006.01) |
| *F16F 9/348* | (2006.01) |
| *B60G 13/08* | (2006.01) |
| *B60G 17/015* | (2006.01) |
| *B60G 17/08* | (2006.01) |

(52) U.S. Cl.
CPC ............... *F16F 9/516* (2013.01); *F16F 9/19* (2013.01); *F16F 9/3488* (2013.01); *F16F 9/464* (2013.01); *B60G 13/08* (2013.01); *B60G 17/0152* (2013.01); *B60G 17/08* (2013.01); *B60G 2202/24* (2013.01); *B60G 2206/41* (2013.01); *B60G 2500/11* (2013.01); *B60G 2800/162* (2013.01); *F16F 2222/12* (2013.01); *F16F 2228/066* (2013.01); *F16F 2230/18* (2013.01)

(58) Field of Classification Search
CPC .... F16F 9/516; F16F 9/19; F16F 9/464; F16F 9/3488; F16F 2222/12; F16F 2228/066; F16F 2230/18; B60G 13/08; B60G 2202/24; B60G 2206/41; B60G 2500/11; B60G 2800/162
USPC ................................ 188/266.2–266.5, 299.1
See application file for complete search history.

(56) References Cited

U.S. PATENT DOCUMENTS

| | | |
|---|---|---|
| 3,986,118 A | 10/1976 | Madigan |
| 5,368,142 A | 11/1994 | Ashiba et al. |
| 5,952,823 A | 9/1999 | Sprecher et al. |
| 6,135,250 A | 10/2000 | Foerster et al. |
| 6,305,512 B1 | 10/2001 | Heinz et al. |

(Continued)

*Primary Examiner* — Christopher P Schwartz (57) ABSTRACT

A vehicle damper assembly is disclosed. The damper includes a cylinder having an inner diameter (ID). A rod and a piston, the piston coupled to the rod and configured to divide the cylinder into a compression side and a rebound side. An electronic valve assembly including an electronic valve body coupled with the rod on the compression side of the piston. The electronic valve body having an electronic valve body outer diameter (OD). A boost valve having a boost valve body, a boost valve area located between the electronic valve body and the boost valve body, the boost valve having a boost valve OD. The boost valve OD is larger than the electronic valve body OD, such that the boost valve is configured to allow the electronic valve assembly to operate within said cylinder ID that is too large for the electronic valve body OD.

10 Claims, 8 Drawing Sheets

(56) References Cited

U.S. PATENT DOCUMENTS

| | | |
|---|---|---|
| 7,374,028 B2 | 5/2008 | Fox |
| 8,627,932 B2 | 1/2014 | Marking |
| 8,641,052 B2 | 2/2014 | Kondo et al. |
| 8,678,148 B2 | 3/2014 | Piotrowski et al. |
| 8,857,580 B2 | 10/2014 | Marking |
| 9,033,122 B2 | 5/2015 | Ericksen et al. |
| 9,120,362 B2 | 9/2015 | Marking |
| 9,239,090 B2 | 1/2016 | Marking et al. |
| 11,448,283 B2 * | 9/2022 | Strickland ............... F16F 9/469 |
| 2005/0258009 A1 | 11/2005 | Reinhardt et al. |

* cited by examiner

FIG. 6 up upon any or all of vehicle speed, damper rod speed, and
MAIN PISTON BOOST VALVE IN A VEHICLE DAMPER

CROSS-REFERENCE TO RELATED APPLICATIONS

This application claims priority to and benefit of co-pending U.S. patent application Ser. No. 16/862,156 filed on Apr. 29, 2020, entitled "MAIN PISTON BOOST VALVE IN A VEHICLE DAMPER" by Rick Strickland, and assigned to the assignee of the present application, the disclosure of which is hereby incorporated by reference in its entirety.

The application Ser. No. 16/862,156 claims priority to and benefit of U.S. Provisional Patent Application No. 62/840,030 filed on Apr. 29, 2019, entitled "MAIN PISTON BOOST VALVE IN A VEHICLE DAMPER" by Rick Strickland, and assigned to the assignee of the present application, the disclosure of which is hereby incorporated by reference in its entirety.

FIELD OF THE INVENTION

Embodiments of the present technology generally relate to a damper assembly for a vehicle. More specifically, certain embodiments relate to a boost valve used in a vehicle damper.

BACKGROUND

Vehicle suspension systems typically include a spring component or components and a damping component or components. Typically, mechanical springs, like helical springs are used with some type of viscous fluid-based dampening mechanism and the two are mounted functionally in parallel. In some instances, features of the damper or spring are user-adjustable.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore into to be considered limiting of its scope, for the invention may admit to other equally effective embodiments.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

As discussed herein, an electronic main piston valve (having a given diameter) is designed for a given column of oil. If the same electronic main piston valve is placed into a larger diameter cylinder, then the new column of oil size would also be larger. However, the original electronic main piston valve would not be able to move through any more oil than it previously could (in the original smaller diameter cylinder body). Therefore, the ability of the electronic main piston valve to move through the new larger diameter column of oil will be inhibited. This will result in a reduced range and reduced operational characteristics.

In one embodiment, a boost valve is used to increase the overall flow of the system to allow the electronic main piston valve to be used in a larger diameter cylinder. Moreover, the boost valve will change a flow through the electronic main piston valving by adding a second parallel path. In general, the electronic main piston valving with the added boost valve configuration will allow the now boosted electronic main piston valve to be installed into a larger diameter cylinder 120 and provide a large damping force range even with the lower flow rate. In one embodiment, the boost valve amplifies the damping force on the compression side of the damper. Moreover, the boost valve can be added to almost any electronic main piston valve when the original body size of the electronic main piston valve (e.g., the diameter of the valve body) is too small for the larger diameter cylinder 120.

The following discussion will begin with a general description of a vehicle suspension damper, including the boost valve, in accordance with an embodiment. (See FIG. 1). The discussion continues with a detailed description of the boost valve, in accordance with an embodiment. (See FIGS. 2A-5)

Further, in the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

As used herein, the terms "down", "up", "down-ward", "upward", "lower", "upper" and other direction references are relative and are used for reference only.

Figure 1A:
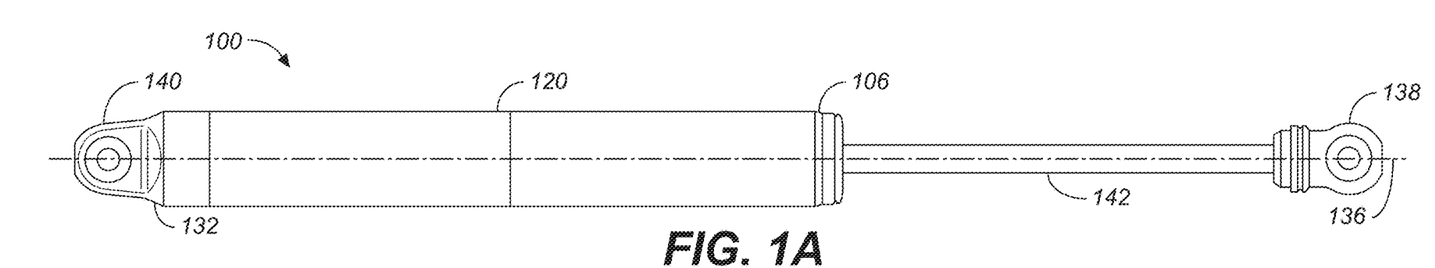
FIG. 1A is a perspective view of a vehicle suspension damper having a main piston boost valve, in accordance with an embodiment.
Figure 1B:
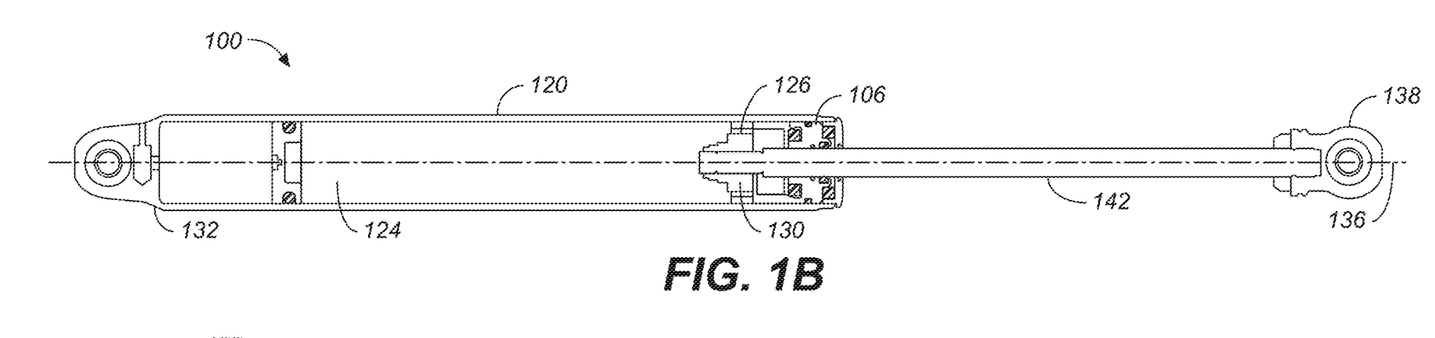
FIG. 1B is a side-sectional view of a vehicle suspension damper having a main piston boost valve, in accordance with an embodiment.

FIG. 1A is a perspective view of a vehicle suspension damper 100 with a boost valve 225, in accordance with an embodiment. FIG. 1B is a side-sectional view of the vehicle suspension damper 100 with a boost valve 225.

Figure 1C:
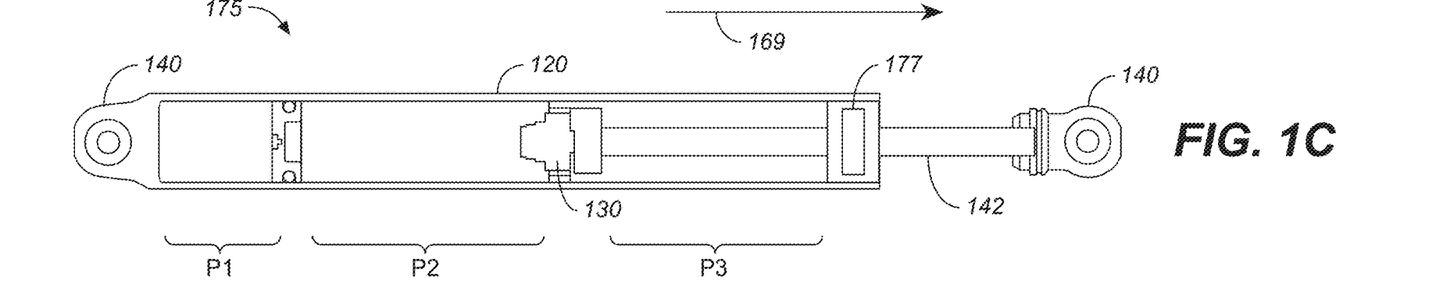
FIG. 1C is a section view of a monotube shock illustrating the different pressure areas therein, in accordance with an embodiment.

Vehicle suspension damper 100 of FIGS. 1A and 1B, includes a cylinder 120 having an interior 124, a first end 132, a second end 106 and defining an axis 136. The vehicle suspension damper 100 further includes a piston rod 142 with a piston 130 mounted therewith. The piston 130 is within the cylinder 120 and moves with the piston rod 142 between the first end 132 and the second end 106 along axis 136. Although a monotube type damper is shown in FIGS. 1A-1C, it is merely for purposes of clarity. It should be appreciated that vehicle suspension damper 100 could be a twin tube, have a bypass, could include a bottom out control (BOC), could include a reservoir, etc. Certain features of reservoir type dampers are shown and described in U.S. Pat. No. 7,374,028, which is incorporated herein, in its entirety, by reference.

The upper portion of the piston rod 142 is supplied with a bushing set 138 for connecting to a portion of a vehicle component such as a wheel suspension linkage. In one embodiment, vehicle suspension damper 100 uses an eyelet 140 to be mounted to one part of the vehicle, while the lower part of the vehicle suspension damper 100 is attached to another portion of the vehicle, such as the frame. In one embodiment, a spring member is used to act between the same portions of the vehicle as the vehicle suspension damper. As the piston rod 142 and the piston 130 move into the cylinder 120 (during compression), the working fluid slows the movement of the two portions of the vehicle relative to each other due, at least in part, to the incompressible fluid moving through a flow paths 126 (past shims 220) provided in the piston 130 and/or through a flow path 256, as will be described in FIGS. 2A-2C. As the piston rod 142 and the piston 130 move out of the cylinder 120 (during extension or "rebound"), fluid meters again through flow paths 126 and the flow rate and corresponding rebound rate is controlled, at least in part, by the shims 210.

FIG. 1C is a section view 175 of a monotube shock illustrating the different pressure areas therein as shown in accordance with an embodiment. In general, the monotube shock includes cylinder 120, mounting eyelets 140, seal 177, piston rod 142, piston 130, and floating piston 193. P1 is the pressure in the nitrogen (or other gas) filled section, P2 is the fluid pressure on the compression side of the piston, and P3 is the fluid pressure on the rebound side. As described herein in the discussion of FIG. 2C, the fluid pressure P3 is created by the rebound damping (e.g., piston 130 moving in rebound direction 169).

Example Boost Valve

Figure 2A:
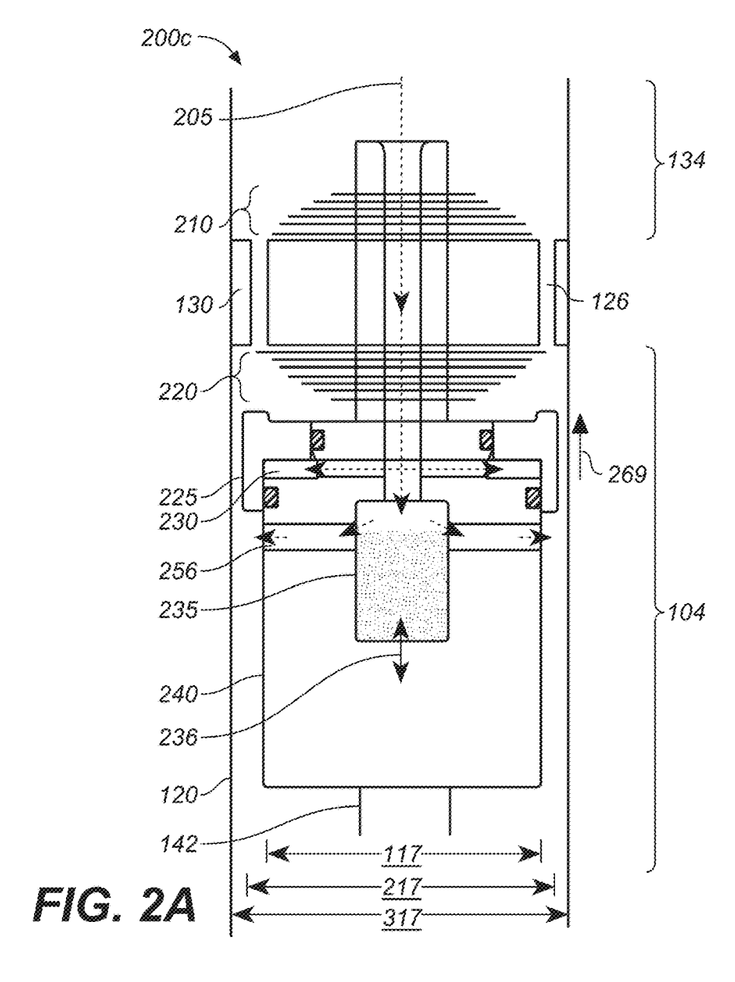
FIG. 2A is an enlarged section view showing flow through the main piston boost valve during a compression stroke, in accordance with an embodiment.
Figure 2B:
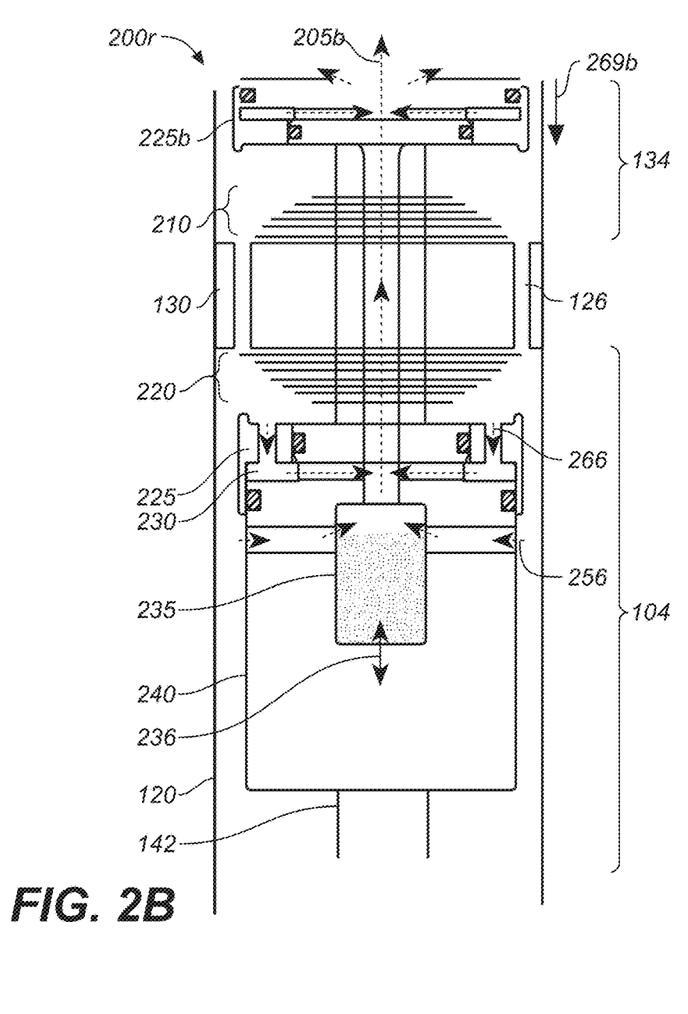
FIG. 2B is an enlarged section view showing the main piston boost valve during a rebound stroke, in accordance with an embodiment.

FIG. 2A is a line drawing 200c showing the fluid flow in a compression stroke of the damper with boost valve 225 in accordance with an embodiment. FIG. 2B is a line drawing 200r showing the fluid flow in a rebound stroke of the damper with boost valve 225 in accordance with an embodiment. In the following discussion, the aspects of both 200c and 200r will be described with respect to FIG. 2A, with any differences between compression and rebound also being described.

In general, FIG. 2A includes an oil flow path 205, rebound valving (e.g., shims 210), main damping piston 130, compression valving (e.g., shims 220), a boost valve 225, a boost valve area 230, an electronic valve 235 having flow path 256, and a valve body 240 (including a coil) in accordance with an embodiment. In one embodiment, electronic valve 235 may be a spool valve or the like. In one embodiment, boost valve area 230 is the area identified as P2 in FIG. 1C.

In one embodiment, electronic main piston valve 235 has a diameter 117. In this example, the electronic main piston valve 235 is being used in a cylinder 120 that has a larger diameter 317. In general, the difference in diameter between 117 and 317 would make electronic main piston valve 235 unsatisfactory for use therein. However, boost valve 225 has a diameter 217 which is appropriate for cylinder 120 with diameter 137. Therefore, by fitting boost valve 225 about the electronic main piston valve 235, the working diameter of the electronic main piston valve 235 is increased from diameter 117 to diameter 217, which as stated above, is an appropriate size for the larger diameter cylinder 120.

In addition to increasing the diameter of the electronic main piston valve 235 from diameter 117 to working diameter 217 and ensuring a proper fit with respect to the larger diameter cylinder 120; the boost valve 225 also provides an increase in the damping force. That is, on the compression stroke, pressure builds up in boost valve area 230 causing the boost valve 225 to clamp down on the valve shims 220 (as shown by arrow 269) which increases the damping force. In one embodiment, the electronic main piston valve 235 is proportional so that the pressure inside the boost valve area 230 also changes in result to a change in damping force.

For example, an electronic main piston valve 235 of a diameter 117 is designed for a given column of oil. If the same electronic main piston valve 235 is placed into a larger diameter cylinder 120, then the new column of oil size would also be larger. However, the original electronic main piston valve 235 would not be able to allow any more oil to flow therethrough than it previously could (in the original smaller diameter cylinder body). Therefore, the ability of the electronic main piston valve 235 to move through the new larger diameter column of oil will be inhibited. This will result in a reduced range and reduced operational characteristics. In one embodiment, during compression, boost valve 225 is used to increase the damping force on the compression side 104 as described herein. Moreover, boost valve 225 can be added to almost any electronic main piston valve 235 when the original body size of the electronic main piston valve 235 (e.g., diameter 117) is too small for a cylinder 120 with a larger diameter 317 than that for which the electronic main piston valve 235 was initially sized.

In one embodiment, the fluid meters from one side of the piston 130 to the other side by passing through flow paths 126 formed in the piston 130. In one embodiment, rebound valving (e.g., shims 210) and compression valving (e.g., shims 220) are used to partially obstruct the flow paths 126 in each direction. By selecting shims 210 and 220 having certain desired stiffness characteristics, the damping effects caused by the piston 130 can be increased or decreased and damping rates can be different between the compression and rebound strokes of the piston 130. For example, shims 210 are configured to meter rebound flow. Similarly, shims 220 are configured to meter compression flow. Note that piston apertures (not shown) may be included in planes other than those shown (e.g. other than apertures used by flow paths 126 and 126) and further that such apertures may, or may not, be subject to the shims 210 and 220 as shown (because for example, the shims 210 and 220 may be clover-shaped or have some other non-circular shape).

In one embodiment, electronic valve 235 is used to drive the opening and closing of flow path 256. The electronic valve 235 will move as shown by arrow 236. When electronic valve is closed, pressure builds up in the boost valve area 230 causing boost valve 225 to clamp down against the compression valving (e.g., shims 220) of the main damping piston (as shown by arrow 269) thereby increasing the damping force. In general, the greater the pressure in the boost valve area 230 causes a greater clamping force to be exerted by the boost valve 225 on the compression valving (e.g., shims 220) which results in a greater increase in damping force. In one embodiment, the force exerted by the boost valve 225 on the compression valving will cause a greater cracking pressure during the compression.

For example, electronic valve 235 is used to open, close, or partially open/close fluid path 256 to modify the flowrate of the fluid between the compression side 104 of the cylinder 120 and the rebound side 134. In one embodiment, the active operation includes an active signal received by a receiver at electronic valve 235 from a computing system. For example, to adjust the flowrate of the fluid between the compression side 104 of the cylinder 120 and the rebound side 134, the command would be provided from the computing system and received at electronic valve 235 which would then automatically open, close or partially open fluid path 256.

Referring now to FIG. 2B, in a rebound stroke oil flows through the electronic valve 235 and out the center piston shaft as shown by flow direction 205b. The rebound flow also passes through flow path 266 of boost valve 225, which is shown in further detail in FIG. 2C. In one embodiment, boost valve 225 is an active valve.

In one embodiment, as shown in FIG. 2B, a similar boost valve 225b configuration is located on the rebound side to provide additional rebound control. Moreover, it should be appreciated that in one embodiment, there could be a single boost valve 225 on a compression side, a single boost valve 225b on a rebound side, or in one embodiment, there is a boost valve 225 on the compression side and a boost valve 225b on the rebound side to provide additional compression and rebound control.

Figure 2C:
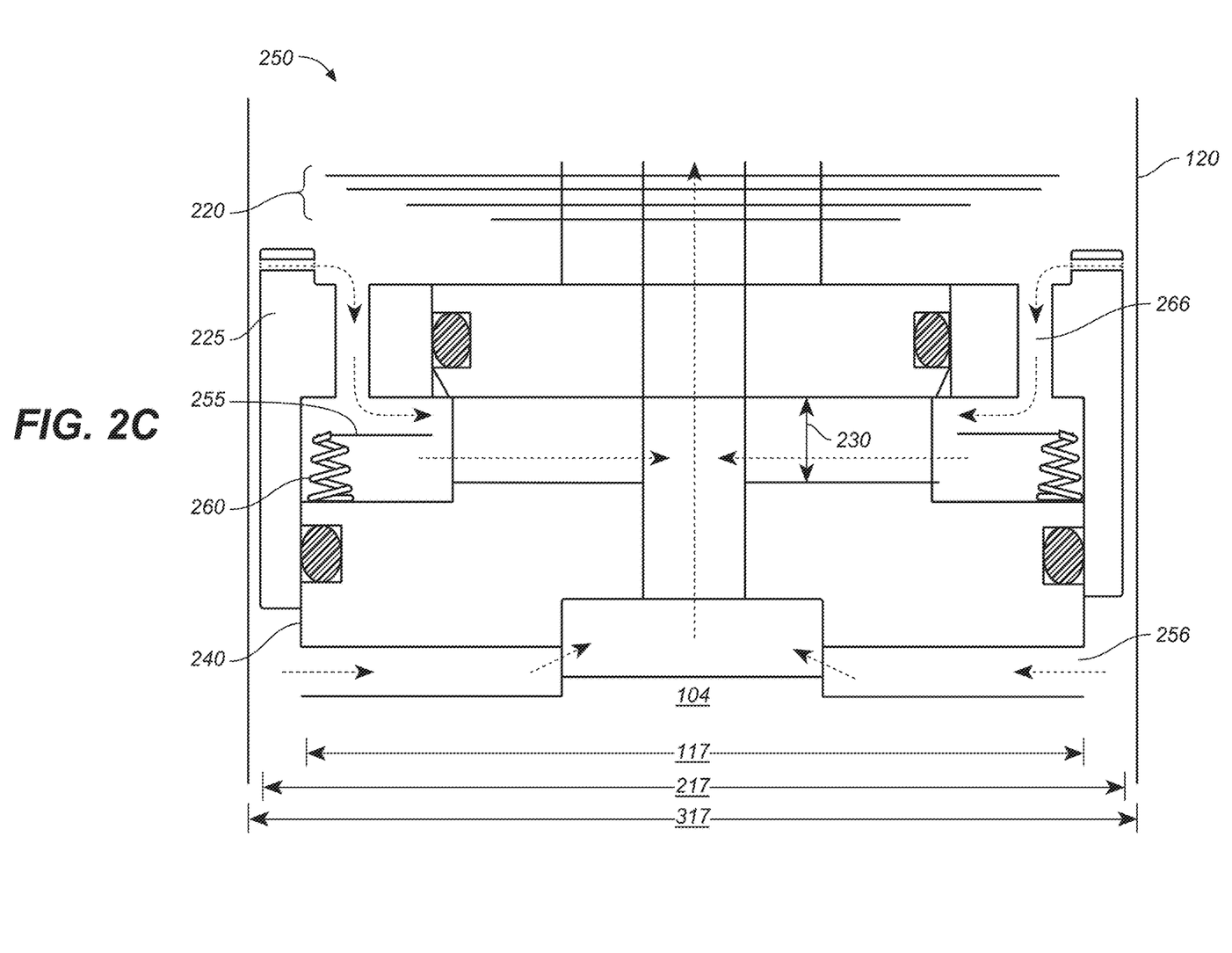
FIG. 2C is an enlarged section view of the main piston boost valve, in accordance with an embodiment.

Referring now to FIG. 2C, an enlarged section view 250 of the main piston boost valve 225 during a rebound is shown in accordance with an embodiment. In one embodiment, FIG. 2C includes cylinder 120, compression valving (e.g., shims 220), valve body 240, flow path 256, main piston boost valve 225, boost valve area 230, boost valve flow paths 266, check shim 255, and return spring 260.

Referring now to FIG. 2C in conjunction with FIG. 1C, in one embodiment of a monotube with no bypass, on a rebound stroke there are different pressures in different chambers. For example, in one embodiment, P1 (the pressure in the nitrogen filled section) is equal to P2 (the pressure on the compression side), while P3 (the pressure on the rebound side) is larger than P1 and P2. In one embodiment, the pressure differential of boost valve area 230 is the same as P1 and P2 and because P3 pressure is higher, the boost valve 225 to moves away from the compression valving stack (e.g., shims 220). If this movement away from the compression valving stack occurs during rebound, during the next compression a lag will occur as boost valve 225 moves back into its correct position relative to the compression valving stack (e.g., shims 220).

One way of overcoming the deleterious movement of boost valve 225 away from shims 220 is to add a check shim 255 to flow path 266. In one embodiment, the check shim 255 will allow fluid flow through flow path 266 to equalize the pressure differential between P3 and boost valve area 230, that would otherwise cause the contraction of boost valve area 230 during the rebound stroke. Thus, in one embodiment, the fluid allowed through flow path 266 will allow boost valve 225 to remain in its appropriate location.

In one embodiment, to ensure the closure of flow through flow path 266 is to add a return spring 260 to check shim 255. In one embodiment, by adding the return spring 260, as the damper comes to the end of the rebound and the pressure differential is naturally being reduced, return spring 260 will cause check shim 255 to close the flow of fluid through fluid path 266. Thus, the boost valve 225 will remain in its appropriate location and be configured for the next compression stroke at a point before the rebound stroke ends.

Figure 2D:
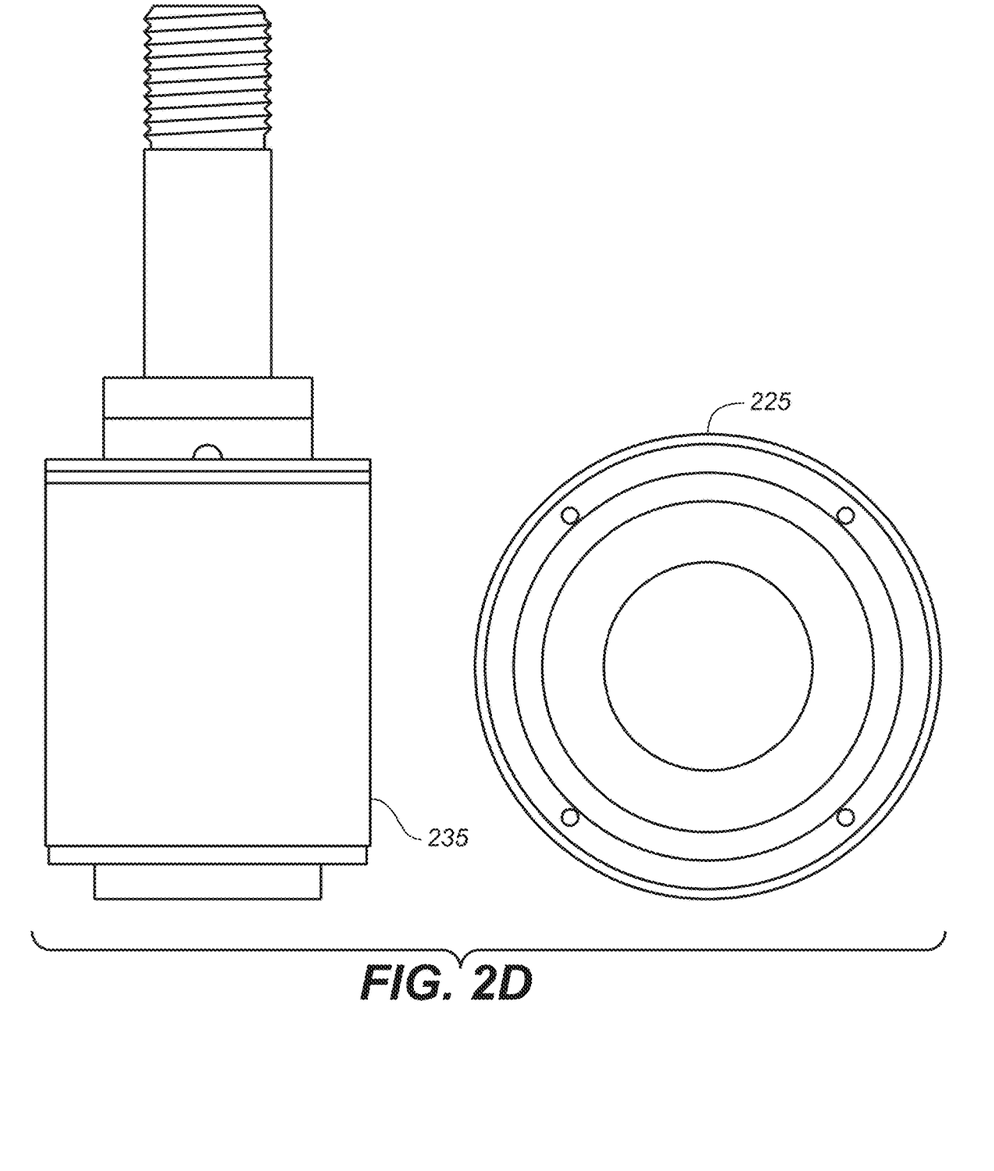
FIG. 2D is an illustration of the main piston boost valve separated into the electronic main piston valve and the boost valve, in accordance with an embodiment.
Figure 2E:
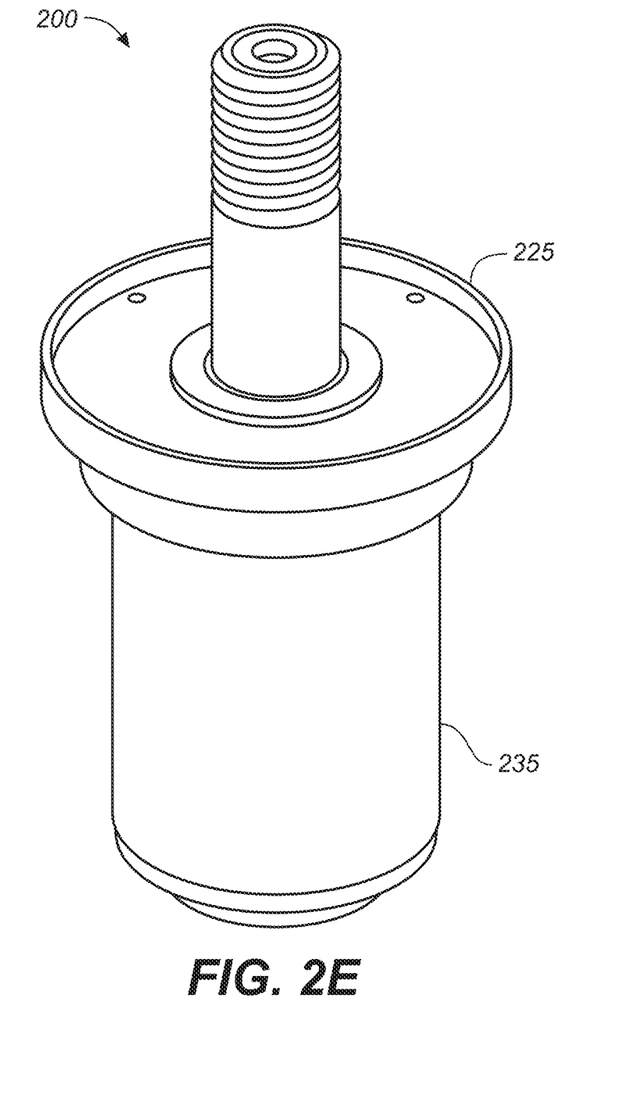
FIG. 2E is an illustration that shows the combination of the electronic main piston valve and the boost valve, in accordance with an embodiment.

FIG. 2D is an illustration that shows the separated components, e.g., electronic main piston valve 235 and the boost valve 225. FIG. 2E is an illustration that shows the electronic main piston valve and piston 235 and the boost valve 225 combined in the configuration 200 of FIGS. 2A-2C.

FIGS. 2D and 2E provide a boost valve 225 which can fit about the electronic main piston valve 235 to increase the diameter of the electronic main piston valve 235 to the size of the larger diameter cylinder 120. In addition to increasing the diameter of the electronic main piston valve 235 to ensure a proper fit in the larger diameter cylinder 120, the boost valve 225 also provides an increase in the damping force. That is, on the compression stroke, pressure builds up in boost valve area 230 causing the boost valve 225 to clamp down on the valve shims 220 (as shown by arrow 269) which increases the damping force. In one embodiment, the electronic main piston valve 235 is proportional so that the pressure inside the boost valve area 230 also changes in result to a change in damping force.

For example, an electronic main piston valve 235 of a certain diameter is designed for a given column of oil. If the same electronic main piston valve 235 is placed into a larger diameter cylinder 120, then the new column of oil size would also be larger. However, the original electronic main piston valve 235 would not be able to allow any more oil to flow therethrough than it previously could (in the original smaller diameter cylinder body). Therefore, the ability of the electronic main piston valve 235 to move through the new larger diameter column of oil will be inhibited. This will result in a reduced range and reduced operational characteristics. In one embodiment, during compression, boost valve 225 is used to increase the damping force on the compression side 104. In general, boost valve 225 amplifies the damping force on the compression side 104. Moreover, boost valve 225 can be added to almost any electronic main piston valve 235 when the original body size of the electronic main piston valve 235 (e.g., a diameter of the valve body) is too small for the larger diameter cylinder 120.

In one embodiment, one of boost valve 225 and electronic main piston valve 235 are active valves. In another embodiment, both the boost valve 225 and electronic main piston valve 235 are active valves. In one embodiment, boost valve 225 and/or electronic main piston valve 235 will be actuated manually or automatically. In one embodiment, the active operation includes an active signal received by electronic main piston valve 235 from a computing device. For example, the user would have an app on a smart phone (or other computing device) and would control the settings via the app, or electronic main piston valve 235 would receive input from the computing system such as shown in FIG. 5.

Figure 4:
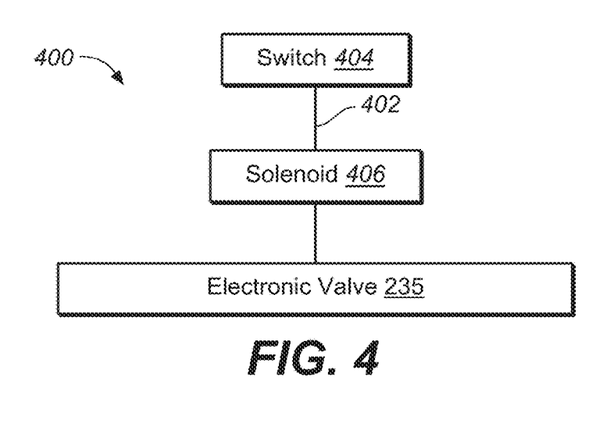
FIG. 4 is a schematic diagram showing a control arrangement for a remotely-operated boost valve, in accordance with an embodiment.
Figure 5:
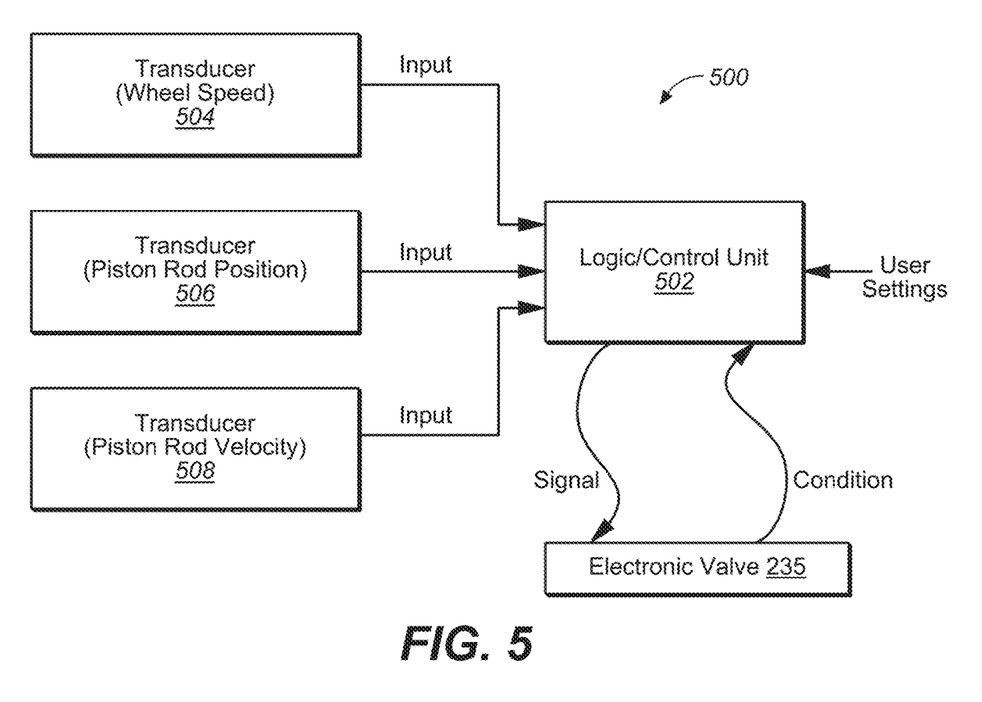
FIG. 5 is a schematic diagram of a control system based upon any or all of vehicle speed, damper rod speed, and damper rod position, in accordance with an embodiment.
Figure 6:
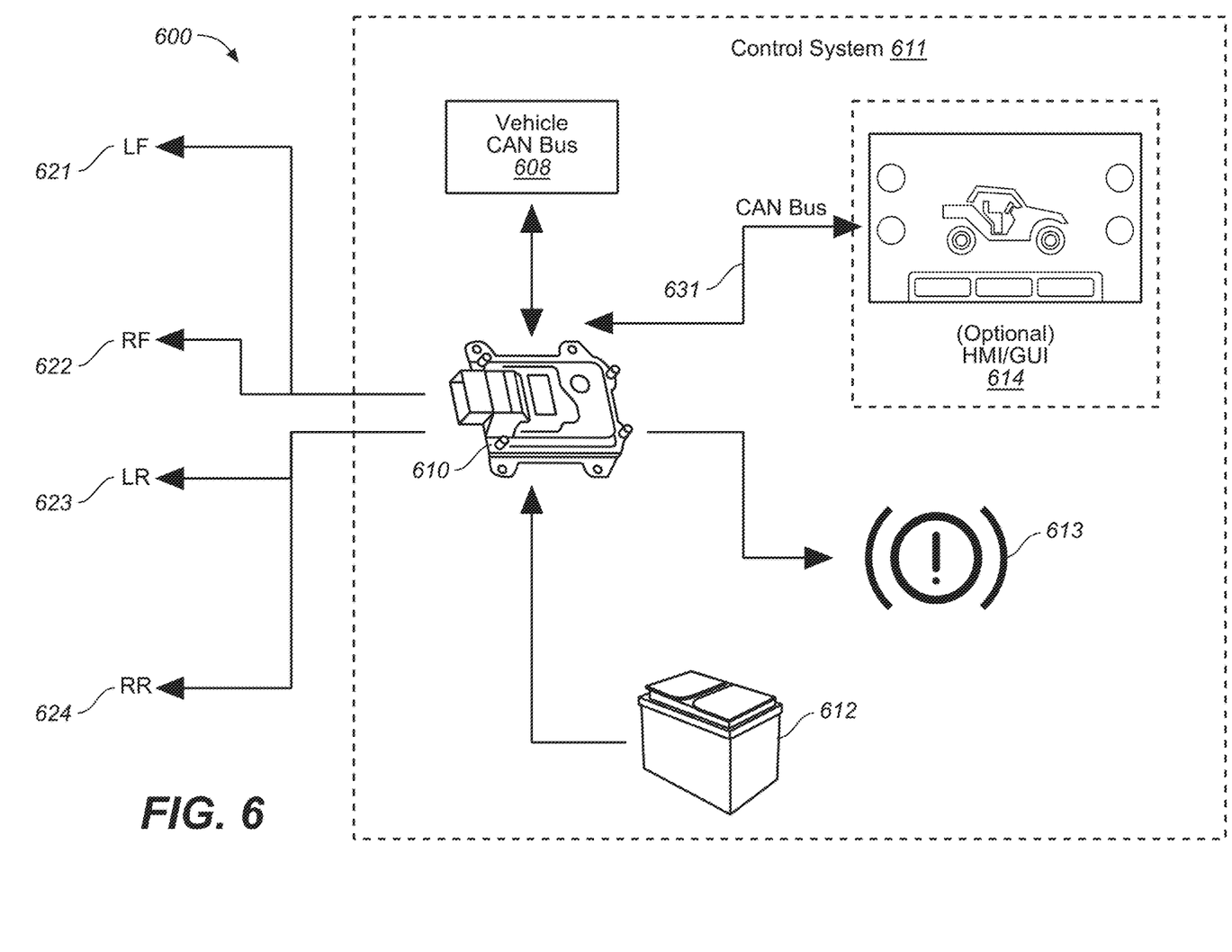
FIG. 6 is a block diagram of an electronic damping control system, in accordance with an embodiment.

In general, electronic valve 235 is operated as discussed in FIGS. 4-6 to modify the flowrate of the fluid between the rebound side 134 and the compression side 104 of the cylinder 120. For example, in one embodiment, the active operation includes an active signal received by a receiver at electronic main piston valve 235 from a computing system. In one embodiment, to adjust the flowrate of the fluid between the rebound side 134 and the compression side 104 of the cylinder 120, the command would be provided from the computing system and received at electronic main piston valve 235 which would then automatically open, close or partially open fluid path 256.

Although two active valves are shown in FIGS. 2A-2E, it is understood that any number of active valves corresponding to any number of fluid channels (e.g., bypass channels, reservoir channels, bottom out channels, etc.) for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s): for an internal bypass, for an external bypass, for a fluid conduit to the reservoir, etc. In other words, anywhere there is a fluid flow path within a suspension damper 100, an active valve could be used. Moreover, the active valve could be alone or used in combination with other active valves at other fluid flow paths to automate one or more of the damping performance characteristics of the dampening assembly. Moreover, additional switches could permit individual operation of separate boost valves.

In one embodiment, due to the boost valve 225 and standard valve arrangement, a relatively small solenoid (using relatively low amounts of power) can generate relatively large damping forces. Furthermore, due to incompressible fluid inside the vehicle suspension damper 100, damping occurs as the fluid path 256 is opened, closed, or changed in size (such as by movement of a sleeve). The result is a controllable damping rate. Certain active valve and bypass features are described and shown in U.S. Pat. Nos. 9,120,362; 8,627,932; 8,857,580; 9,033,122; and 9,239,090 which are incorporated herein, in their entirety, by reference. The operation of active valves is described in further detail in FIGS. 4-6.

In one embodiment, the electronic main piston valve 235 is employed on the main piston 130 directly. Thus, there is electronic main piston valve 235 and boost valve 225 on the main piston. In one embodiment, boost valve 225 is used to increase the diameter of a cylinder within which the electronic main piston valve 235 will be used. Moreover, in one embodiment, the electronic main piston valve 235 adds level of flow control via the electronic main piston valve 235 flow paths 256, and the boost valve 225 provides an increase in the damping force during the compression stroke, by clamp down on the valve shims 220.

Figure 3:
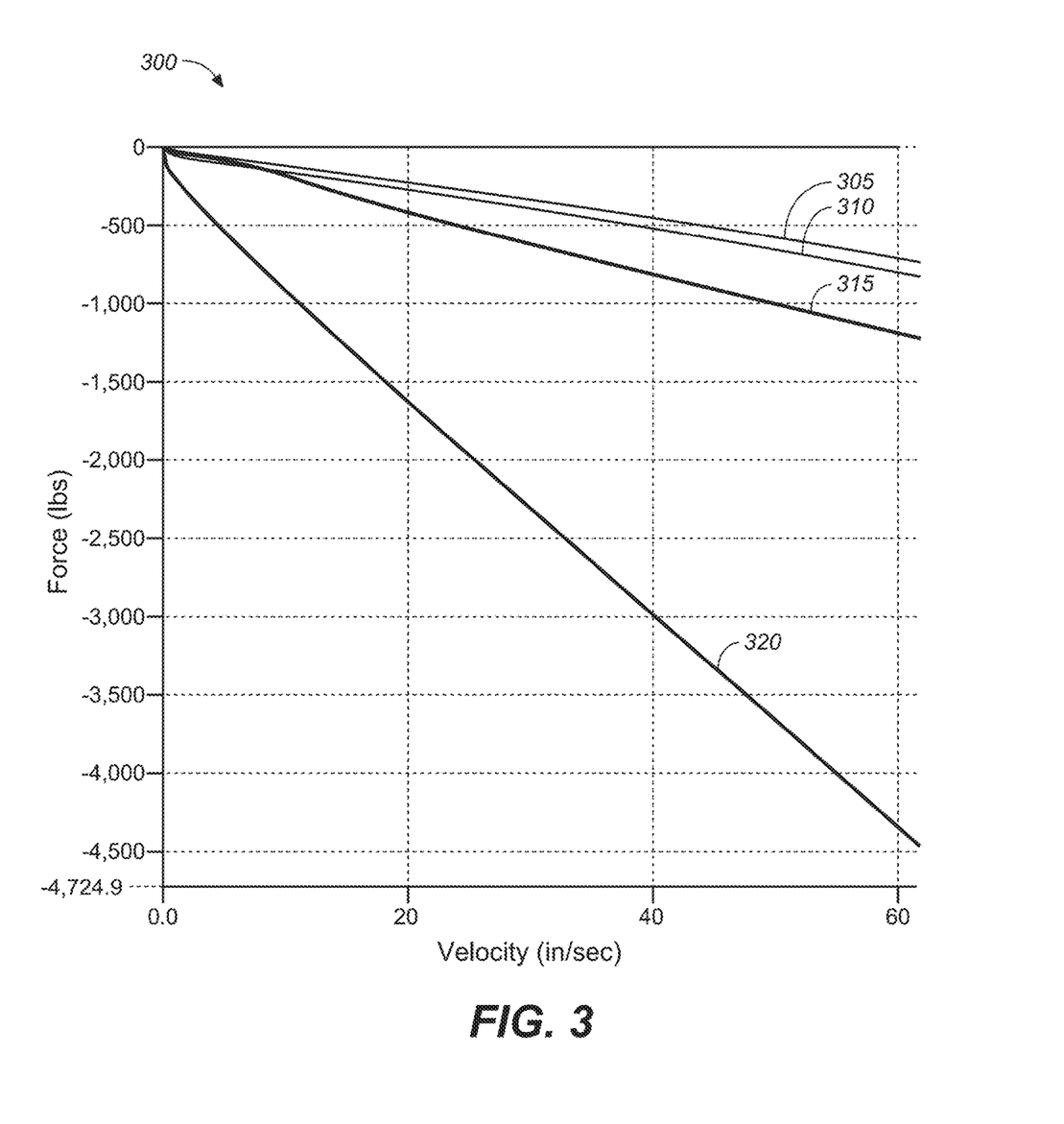
FIG. 3 is a compression force graph in accordance with an embodiment.

For the softest setting, the flow paths for the electronic main piston valve 235 would be opened. In contrast, the firmest setting would be by closing the electronic main piston valve 235 flow paths. In one embodiment, closing the electronic main piston valve 235 flow paths would increase the range in the damping for the compression stroke (as shown in FIG. 3). In one embodiment, the electronic main piston valve 235 and the boost valve 225 are controlled by a power line that travels down a hollowed interior within the shaft of piston rod 142.

FIG. 3 is a graph 300 that shows the difference in force that is obtained during compression by the use of boost valve 225. In general, lines 305, 310, and 315 are different results in the compression stroke when no boost valve 225 is used.

In contrast, line 320 shows the increase in force that is obtainable during the compression stroke when boost valve 225 is used. Although the configuration is shown for compression, it should be appreciated that a similar boost valve 225b configuration could also be used on the rebound side to provide additional rebound control (as shown in FIG. 2B). Moreover, it should be appreciated that one or more boost valves could be configuration to be used on both the compression side and the rebound side to provide additional compression and rebound control.

Referring now to FIG. 4, in one embodiment, the active valve(s) are solenoid operated, hydraulically operated, pneumatically operated, or operated by any other suitable motive mechanism. For purposes of clarity, the following active valve discussion will refer to the electronic valve 235. However, it should be appreciated that the active valve discussion can be applied to any active valves in the damping system (e.g., boost valve 225, and the like).

In one embodiment, electronic valve 235may be operated remotely by a switch or potentiometer located in the cockpit of a vehicle or attached to appropriate operational parts of a vehicle for timely activation (e.g. brake pedal) or may be operated in response to input from a microprocessor (e.g. calculating desired settings based on vehicle acceleration sensor data) or any suitable combination of activation means. In like manner, a controller for electronic valve 235 may be cockpit mounted and may be manually adjustable or microprocessor controlled or both or selectively either.

It may be desirable to increase the damping rate or effective stiffness of vehicle suspension damper 100 when moving a vehicle from off-road to on highway use. Off-road use often requires a high degree of compliance to absorb dampers imparted by the widely varying terrain. On highway use, particularly with long wheel travel vehicles, often requires more rigid damper absorption to allow a user to maintain control of a vehicle at higher speeds. This may be especially true during cornering or braking.

One embodiment comprises a four-wheeled vehicle having vehicle suspension damper 100 wherein the flowrate of the fluid between the compression side 104 of the cylinder 120 and the rebound side 134 is automatically adjustable using electronic valve 235 at each (of four) wheel.

For example, the opening size of the fluid path 256 is automatically adjusted by electronic valve 235 (including, for example, a remotely controllable electronic valve 235). In one embodiment, each of the front damper absorbers may be electrically connected with a linear switch (such as that which operates an automotive brake light) that is activated in conjunction with the vehicle brake. When the brake is moved beyond a certain distance, corresponding usually to harder braking and hence potential for vehicle nosedive, the electric switch connects a power supply to a motive force generator for electronic valve 235 in the front dampers causes electronic valve 235 to automatically close or partially the fluid paths 256.

In so doing, the closing of the electronic valve 235 fluid paths will increase the stiffness of that damper. As such, the front dampers become more rigid during hard braking. Other mechanisms may be used to trigger the dampers such as accelerometers (e.g. tri-axial) for sensing pitch and roll of the vehicle and activating, via a microprocessor, the appropriate input to electronic valve 235 to cause electronic valve 235 to close, open, partially close, or partially open flow path 256 for optimum vehicle control.

In one embodiment, a vehicle steering column includes right turn and left turn limit switches such that a hard turn in either direction activates the appropriate adjustment of electronic valve 235 to cause electronic valve 235 to close, open, partially close, or partially open flow path 256 of dampers opposite that direction (for example, a hard, right turn would cause more rigid dampers on the vehicle's left side). Again, accelerometers in conjunction with a microprocessor and a switched power supply may perform the electronic valve 235 activation function by sensing the actual g-force associated with the turn (or braking; or acceleration for the rear damper activation) and triggering the appropriate amount of rotation of electronic valve 235 to cause electronic valve 235 to close, open, partially close, or partially open flow path 256 at a preset acceleration threshold value (e.g., a g-force).

FIG. 4 is a schematic diagram showing a control arrangement 400 for a remotely-operated electronic valve 235. As illustrated, a signal line 402 runs from a switch 404 to a solenoid 406. Thereafter, the solenoid 406 converts electrical energy into mechanical movement and shifts position of electronic valve 235 causing electronic valve 235 to close, open, partially close, or partially open flow path 256. Adjusting the size of flow path 256 modifies the flowrate of the fluid between the compression side 104 of the cylinder 120 and the rebound side 134, thereby varying the stiffness of a corresponding vehicle suspension damper 100.

As discussed, a remotely-operable electronic valve 235 like the one described above is particularly useful with an on-/off-road vehicle. These vehicles can have more than 20" of damper absorber travel to permit them to negotiate rough, uneven terrain at speed with usable damper absorbing function. In off-road applications, compliant dampening is necessary as the vehicle relies on its long travel suspension when encountering often large off-road obstacles. Operating a vehicle with very compliant, long travel suspension on a smooth road at road speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may include excessive pitch and yaw during braking and/or acceleration. With the remotely-operated electronic valve 235, the working size of flow path 256 is automatically adjusted thereby modifying the communication of fluid between the compression side 104 of the cylinder 120 and the rebound side 134. Correspondingly, the dampening characteristics of vehicle suspension damper 100 can be changed.

In addition to, or in lieu of, the simple, switch-operated remote arrangement of FIG. 4, electronic valve 235 can be operated automatically based upon one or more driving conditions. FIG. 5 shows a schematic diagram of a control system 500 based upon any or all of vehicle speed, damper rod speed, and damper rod position. One embodiment of the arrangement of FIG. 5 is designed to automatically increase dampening in a damper absorber in the event a damper rod reaches a certain velocity in its travel towards the bottom end of a damper at a predetermined speed of the vehicle. In one embodiment, the control system 500 adds dampening (and control) in the event of rapid operation (e.g. high rod velocity) of the vehicle suspension damper 100 to avoid a bottoming out of the damper rod as well as a loss of control that can accompany rapid compression of a damper absorber with a relative long amount of travel. In one embodiment, the control system 500 adds dampening (e.g., adjusts the size of the opening of flow path 256 by causing electronic valve 235 to close, open, partially close, or partially open flow path 256) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 5 illustrates, for example, a control system 500 including three variables: wheel speed, corresponding to the speed of a vehicle component (measured by wheel speed transducer 504), piston rod position (measured by piston rod position transducer 506), and piston rod velocity (measured by piston rod velocity transducer 508). Any or all of the variables shown may be considered by logic unit 502 in controlling the solenoids or other motive sources coupled to electronic valve 235 for changing the working size of the opening of flow path 256 by causing electronic valve 235 to close, open, partially close, or partially open flow path 256. Any other suitable vehicle operation variable may be used in addition to or in lieu of the variables 504, 506, and 508 such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 508), and piston rod position (piston rod position transducer 506), a separate wheel speed transducer 504 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 5, the logic unit 502 with user-definable settings receives inputs from piston rod position transducer 506, piston rod velocity transducer 508, as well as wheel speed transducer 504. Logic unit 502 is user-programmable and, depending on the needs of the operator, logic unit 502 records the variables and, then, if certain criteria are met, logic unit 502 sends its own signal to electronic valve 235 (e.g., the logic unit 502 is an activation signal provider) to cause electronic valve 235 to move into the desired state (e.g., adjust the bypass flow rate). Thereafter, the condition, state or position of electronic valve 235 is relayed back to logic unit 502 via a boost valve monitor or the like.

In one embodiment, logic unit 502 shown in FIG. 5 assumes a single electronic valve 235 corresponding to a single flow path 256 of a single vehicle suspension damper 100, but logic unit 502 is usable with any number of boost valves or groups of boost valves corresponding to any number of bypass channels, adjustable bypass ports, or groups of bypass channels or adjustable bypass ports. For instance, the suspension dampers on one side of the vehicle can be acted upon while the vehicles other suspension dampers remain unaffected.

While the examples illustrated relate to manual operation and automated operation based upon specific parameters, the remotely-operated electronic valve 235 can be used in a variety of ways with many different driving and road variables. In one example, electronic valve 235 is controlled based upon vehicle speed in conjunction with the angular location of the vehicle's steering wheel. In this manner, by sensing the steering wheel turn severity (angle of rotation), additional dampening (by adjusting the corresponding size of the opening of flow path 256 by causing electronic valve 235 to close, open, partially close, or partially open flow path 256) can be applied to one vehicle suspension damper 100 or one set of vehicle suspension dampers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of electronic valve 235 (and corresponding change to the working size of the opening of flow path 256 by causing electronic valve 235 to close, open, partially close, or partially open flow path 256) in response thereto. In another example, electronic valve 235 is controlled at least in part by a pressure transducer measuring pressure in a vehicle tire and adding dampening characteristics to some or all of the wheels (by adjusting the working size of the opening of flow path 256 by causing electronic valve 235 to close, open, partially close, or partially open flow path 256) in the event of, for example, an increased or decreased pressure reading.

In one embodiment, electronic valve 235 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces dampening to some or all of the vehicle's dampers (by adjusting the working size of the opening of flow path 256 by causing electronic valve 235 to close, open, partially close, or partially open flow path 256 chambers) in the event of a loss of control to help the operator of the vehicle to regain control.

Referring now to FIG. 6, a block diagram of a modular electronic damping control system 600 is shown in accordance with an embodiment. Modular electronic damping control system 600 includes a plurality of damping components (hereinafter dampers 621-624) and a control system 611.

In one embodiment, there is at least one damper, of the plurality of damping components, located at each of a vehicle wheel suspension location. For example, damper 621 at the left front, damper 622 at the right front, damper 623 at the left rear, and damper 624 at the right rear.

In one embodiment, the plurality of damping components, e.g., dampers 621-624, are selected from the damper types such as, an in-line damper, a piggyback damper, a compression adjust only damper, a rebound adjust only damper, an independent compression and rebound adjust damper, a dependent compression and rebound adjust single valve damper, and the like. A plurality of different damper 621-624 types are shown and described in the discussion of FIGS. 1-3.

Although electronic damping control system 600 is shown as interacting with four dampers 621-624 such as would be likely found in a four wheeled vehicle suspension configuration, it should be appreciated that the technology is well suited for application in other vehicles with different suspension configurations. The different configurations can include two wheel suspension configuration like that of a motorcycle; a one, two or three "wheel" suspension configuration like that of a snowmobile, trike, or boat, a plurality of dampers at each of the damper suspension locations such as found in off-road vehicles, UTV, powersports, heavy trucking, RV, agriculture, maritime, and the like. The use of a single damper in a four suspension location configuration as shown herein is provided merely as one example.

In one embodiment, control system 611 includes shimmed damping control (SDC) 610, vehicle CAN bus 608, CAN Bus 631 to an optional human machine interface (HMI) 614 (or graphical user interface (GUI)), warning 613, and battery 612. It should be appreciated that in an embodiment, one or more components shown within control system 611 would be located outside of control system 611, and similarly additional components would be located within control system 611.

In one embodiment, SDC 610 includes a processor. In operation, both compression and rebound oil flows through independent sophisticated multistage blended circuits in SDC 610 to maximize suspension control. In one embodiment, SDC 610 will control each of the plurality of damping components located at each vehicle wheel suspension location, determine a type of damping component at each vehicle wheel suspension location, automatically tune a vehicle suspension based on the determined type of damping components at each vehicle wheel suspension location, automatically monitor the plurality of damping components and determine when a change has been made to one or more of the plurality of damping components, and automatically re-tune the vehicle suspension based on the change to one or more of the plurality of damping components.

In one embodiment, there is no need for HMI/GUI 614 within the modular electronic damping control system 600. Instead, the suspension configuration will be identified by the warning 613 or lack thereof. In another embodiment, there may be suspension configuration switches instead of an HMI/GUI 614.

In one embodiment, optional HMI/GUI 614 is a GUI that presents a damping configuration and operational information about the damping configuration, e.g., vehicle suspension settings, in a user interactive format, such as on a display located proximal to a vehicle operator.

In one embodiment, optional HMI/GUI 614 is configured to present vehicle suspension setting information in a user interactive format on a display, where the HMI will have a touch input capability to receive an input from a user via a user interaction with the HMI. HMI is also programmable to present damping configuration information, rebound configuration information and/or suspension setting information in a user interactive format on a display.

In one embodiment, the vehicle suspension setting information includes a plurality of different vehicle suspension mode configurations and an identification of which configuration mode is currently active on the vehicle suspension. In one embodiment, the plurality of different vehicle suspension mode configurations is user selectable.

If one or more of the components of dampers 621-624 are automatically adjustable, in one embodiment, control system 611 will automatically adjust one or more of the plurality of damping components of the tuned vehicle suspension based on external conditions such as, weather, terrain, ground type (e.g., asphalt, concrete, dirt, gravel, sand, water, rock, snow, etc.), and the like.

In one embodiment, control system 611 will automatically adjust one or more of the plurality of damping components (dampers 621-624) of the tuned vehicle suspension based on one or more sensor inputs received from sensors such as an inertial gyroscope, an accelerometer, a magnetometer, a steering wheel turning sensor, a single or multi spectrum camera, and the like.

In one embodiment, the electronic damping control system 600 characteristics can be set at the factory, manually adjustable by a user, or automatically adjustable by a computing device using environmental inputs and the like. For example, the suspension characteristics for the dampers 621-624 are manually or automatically adjustable based on user preference, speed, maneuvering, ride type, or the like.

In one embodiment, the adjustable characteristics for the dampers 621-624 are manually adjustable via a user input. For example, via user interaction with HMI/GUI 614.

In one embodiment, the adjustable characteristics for the dampers 621-624 are automatically adjusted based on external conditions, e.g., sensors detecting damper, vibration, or the like. For example, in a smooth operating environment, e.g., on a highway or smooth road, configuration adjustments may be provided by the user via HMI 614, or automatically applied by electronic damping control system 600, to increase firmness in the ride. That is, to provide additional hardness that would increase feedback, feel and precise handling.

In contrast, when rougher terrain is encountered, the user can select a rough terrain setting at HMI 614. In contrast, the electronic damping control system 600 would receive information from one or more sensors (coupled to the suspension near dampers 621-624, via the Vehicle CAN bus 608, or the like) about the rough terrain and re-tune the vehicle suspension based on to a softer setting. That is, to provide appropriate suspension control characteristics for the vehicle. In addition, the adjustment provides a softer ride that would reduce operator/passenger felt vibrations, damper, bumps, and the like thereby reducing operator fatigue and/or.

As described herein, the manual option includes a user selectable switch, icon on a touch display, or the like at the GUI or HMI, that allows a user to make a selection based on given characteristics, e.g., highway mode—for smooth terrain, -off-road mode—for rough terrain, a mixed mode for intermediate terrain, etc. In one embodiment, the manual option is provided at the GUI or HMI. In one embodiment, the manual option may be one or more switches that allow the use to select one or more pre-defined suspension settings. For example, the pre-defined suspension settings can include, but are not limited to, highway, offroad, mixed terrain, rock climbing, racing, performance, sport, wet, and the like.

In an automated mode, electronic damping control system 600 automatically adjusts one or more characteristics for one or more dampers 621-624 based on based on one or more inputs received at the processor of SDC 610. For example, in one embodiment, the steering inputs, vehicle roll, speed, and the like are detected and/or monitored via one or more sensors on or about the vehicle. Similarly, external conditions such as weather, terrain, ground type, and the like are also detected and/or monitored via the one or more sensors on or about the vehicle.

Sensors such as but not limited to, accelerometers, sway sensors, suspension changes, visual identification technology (e.g., single or multi spectrum camera's), driver input monitors, steering wheel turning sensors, and the like. For example, one embodiment uses an inertial measurement unit (IMU) to sense rough terrain. One embodiment has an attitude and heading reference system (AHRS) that provides 3D orientation integrating data coming from inertial gyroscopes, accelerometers, magnetometers and the like. For example, in one embodiment, the AHRS is a GPS aided Microelectromechanical systems (MEMS) based IMU and static pressure sensor.

Moreover, if the electronic damping control system 600 determines that one or more of dampers 621-624 are remotely adjustable, electronic damping control system 600 will be able to adjust those dampers automatically and on the fly. For example, electronic damping control system 600 will set the remotely adjustable dampers into a highway mode during travel down a roadway, e.g., that is configuring the remotely adjustable dampers to operate in a firmer mode, and then as the vehicle transitions to rougher terrain, the remotely adjustable dampers will be reconfigured to a softer setting to increasing absorption of damper and thereby provide a smoother ride.

In one embodiment, the automated or user selectable settings are further adjustable based on actual conditions or as "learned" user settings. For example, if an operator initially sets the electronic damping control system 600 to a rough terrain setting and then the vehicle transitions to a roadway, fire road, highway, or the like. When the sensor feedback causes the electronic damping control system 600 to determine that the vehicle is no longer in rough terrain, electronic damping control system 600 would automatically change the mode to highway mode to provide a more appropriate suspension setting. However, if the operator prefers a harder feel, the operator would override any automatic "on-the-fly" adjustments so that off-road mode is maintained. Similarly, if the user prefers a softer ride, or has been in the seat for a long period of time, the user would adjust the stiffness mode to be a softer seat, provide a smoother ride, or the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

I claim:

1. A damper comprising:
   a cylinder, said cylinder comprising a cylinder inner diameter (ID);
   a rod;
   a piston, said piston coupled to said rod and configured for operation within said cylinder, said piston configured to divide said cylinder into a compression side and a rebound side;
   an electronic valve body coupled with said rod on said compression side of said piston, said electronic valve body comprising an electronic valve body outer diameter (OD), said electronic valve body outer diameter (OD) smaller than said cylinder inner diameter (ID) such that said electronic valve body will have reduced operational characteristics when operating within said cylinder; and
   a boost valve coupled to said piston, said boost valve comprising:
      a boost valve body having a boost valve OD;
      said boost valve OD larger than said electronic valve body OD, said boost valve OD configured to allow said electronic valve body to operate in combination with said boost valve in said cylinder with said cylinder ID and alleviate said reduced operating characteristics.

2. The damper of claim 1, wherein said piston further comprises:
   a piston fluid channel therethrough, said piston fluid channel to fluidly couple said compression side with said rebound side.

3. The damper of claim 2, wherein said electronic valve body further comprises:
   an active valve, said active valve configured to meter a fluid flow of a working fluid through said piston fluid channel.

4. The damper of claim 3, wherein said active valve is configured to meter said fluid flow for an intended column of working fluid found within an intended cylinder ID for which said electronic valve body OD was designed.

5. The damper of claim 3, further comprising:
- a remote control, said remote control configured to remotely configure a setting of said active valve.

6. The damper of claim 1, further comprising:
- a boost valve fluid channel; and
- a check shim within said boost valve, said check shim configured to allow said working fluid to flow through said boost valve fluid channel during a rebound stroke, the check shim to reduce a pressure differential between said boost valve area and said rebound side to maintain a location of said boost valve with respect to said electronic valve body.

7. The damper of claim 6, further comprising:
- a return spring within said boost valve, said return spring coupled with said check shim, said return spring configured to keep a pressure on said check shim and close said check shim when said pressure differential is reduced.

8. The damper of claim 1, wherein said cylinder further comprises:
- a working fluid therein.

9. The damper of claim 1, further comprising:
- a compression valve stack on said compression side of said piston; and
- a rebound valve stack on said rebound side of said piston, wherein said boost valve is configured to provide an additional force to said compression valve stack of said piston to increase a stiffness of a valving of said piston during a compression stroke.

10. The damper of claim 1, further comprising:
- a second boost valve on said rebound side of said piston, said second boost valve configured to provide an additional rebound control for said damper.

* * * * *